United States Patent
Etemad-Moghadam

(10) Patent No.: US 6,678,456 B2
(45) Date of Patent: Jan. 13, 2004

(54) FIBER OPTIC CABLE MANAGEMENT SYSTEM

(75) Inventor: Cyrus Etemad-Moghadam, Owings Mills, MD (US)

(73) Assignee: Ciena Corporation, Linthicum, MD (US)

( * ) Notice: Subject to any disclaimer, the term of this patent is extended or adjusted under 35 U.S.C. 154(b) by 190 days.

(21) Appl. No.: 09/835,604

(22) Filed: Apr. 16, 2001

(65) Prior Publication Data

US 2001/0032728 A1 Oct. 25, 2001

Related U.S. Application Data

(60) Provisional application No. 60/197,192, filed on Apr. 17, 2000.

(51) Int. Cl.[7] .............................................. G02B 6/00
(52) U.S. Cl. ..................................................... 385/134
(58) Field of Search ................................. 385/134–137

(56) References Cited

U.S. PATENT DOCUMENTS

| | | | | |
|---|---|---|---|---|
| 5,100,221 A | | 3/1992 | Carney et al. ............... 385/135 |
| 5,240,209 A | | 8/1993 | Kutsch ......................... 248/49 |
| 5,241,617 A | | 8/1993 | Peacock et al. ............. 385/135 |
| 5,417,589 A | * | 5/1995 | Terada ........................ 439/590 |
| 5,530,787 A | * | 6/1996 | Arnett ......................... 385/137 |
| 5,640,476 A | | 6/1997 | Womack et al. ............... 385/86 |
| 5,640,482 A | * | 6/1997 | Barry et al. ................. 385/134 |
| 5,715,348 A | * | 2/1998 | Falkenberg et al. ......... 385/135 |
| 5,717,811 A | * | 2/1998 | Macken ....................... 385/135 |
| 5,825,962 A | * | 10/1998 | Walters et al. ............. 385/135 |
| 5,954,539 A | * | 9/1999 | Hornung ..................... 439/590 |
| 6,009,224 A | * | 12/1999 | Allen ......................... 385/135 |
| 6,049,040 A | | 4/2000 | Biles et al. ................ 174/68.3 |
| 6,175,079 B1 | | 1/2001 | Johnston et al. ............. 174/50 |
| 6,243,526 B1 | * | 6/2001 | Garibay et al. ............. 385/135 |
| 6,278,829 B1 | * | 8/2001 | BuAbbud et al. ........... 385/135 |
| 6,278,830 B1 | * | 8/2001 | Levesque et al. ........... 385/135 |

FOREIGN PATENT DOCUMENTS

| | | | |
|---|---|---|---|
| DE | 3742448 | 6/1989 | ............ H02G/3/04 |
| EP | 0871047 | 10/1998 | ............ G02B/6/00 |
| WO | 9841891 | 9/1998 | ............ G02B/6/44 |

OTHER PUBLICATIONS

"Providing Technologically Advanced Passive Fiber Optic & Copper Network Solutions for Telecommunications, CATV & Data Communications, " US FiberOptics, pp. 1–44. No date.
PCT, "International Search Report".

* cited by examiner

*Primary Examiner*—Khiem Nguyen
*Assistant Examiner*—Hae Moon Hyeon
(74) *Attorney, Agent, or Firm*—Michael R. Cammarata; James M. Olsen

(57) ABSTRACT

A fiber optic cable management system that may be provided in a bay (or shelf) of an optical communications housing. The fiber optic cable management system includes at least one and preferably several interconnecting fiber optic cable guides. Each fiber optic cable guide includes a radius limiting portion that prevents fiber optic cables from being bent beyond their minimum bend radii. The radius of the radius limiting portion of each guide controls the spacing between a specific guide and its adjacent, interconnecting fiber optic cable guides. The width and height of each fiber optic cable guide may be varied depending upon the optical communications system into which the fiber optic cable management system is utilized. The interconnecting fiber optic cable guides may be easily disconnected from each other to allow the fiber optic cable guides to be used in different quantities. This allows an installer to customize the fiber optic cable management system to match the optical communications equipment.

8 Claims, 2 Drawing Sheets

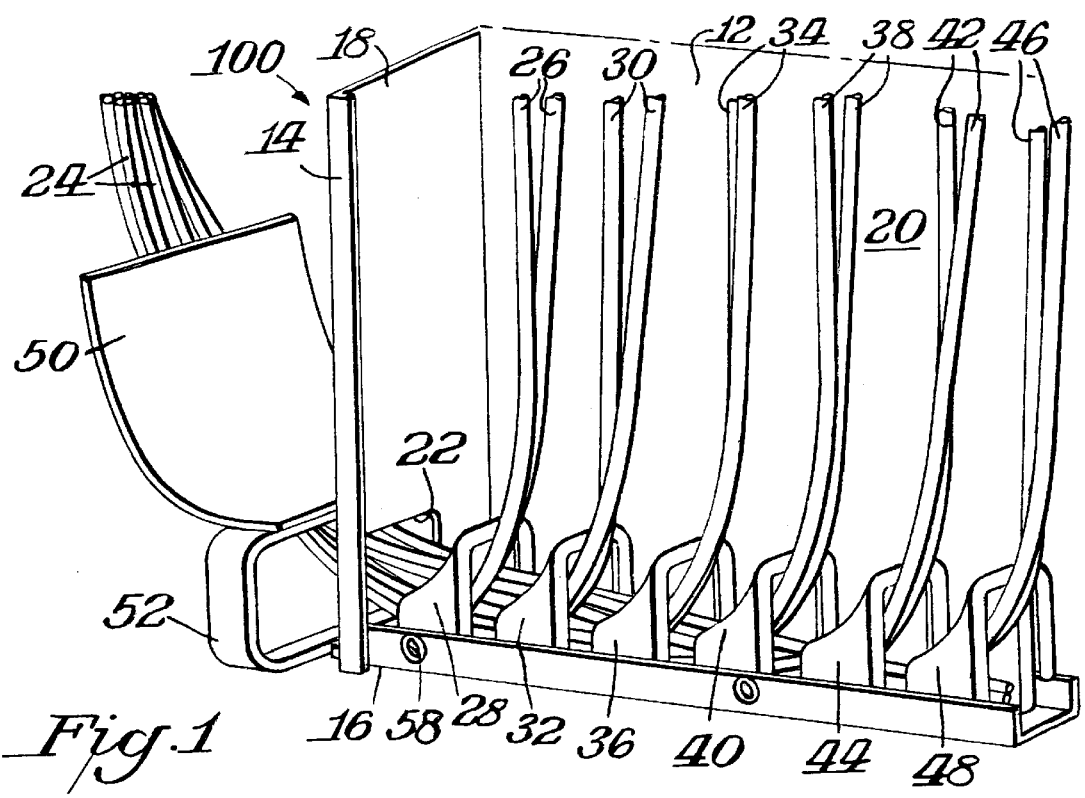
Fig. 1
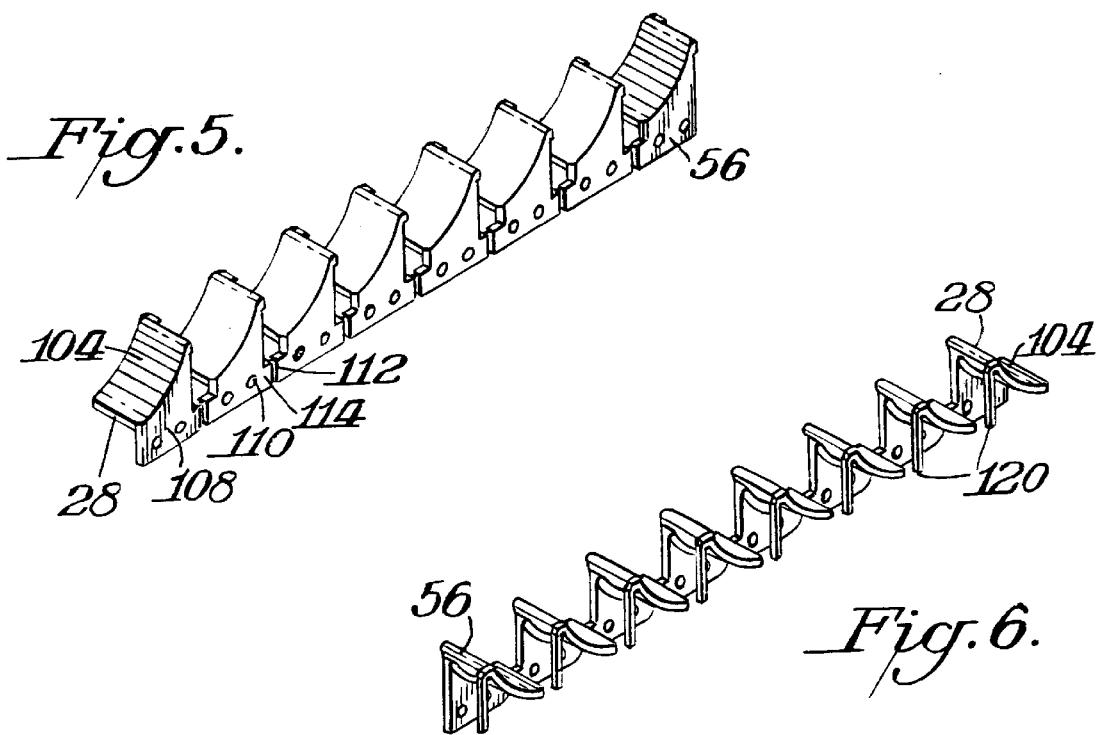
Fig. 5.
Fig. 6.

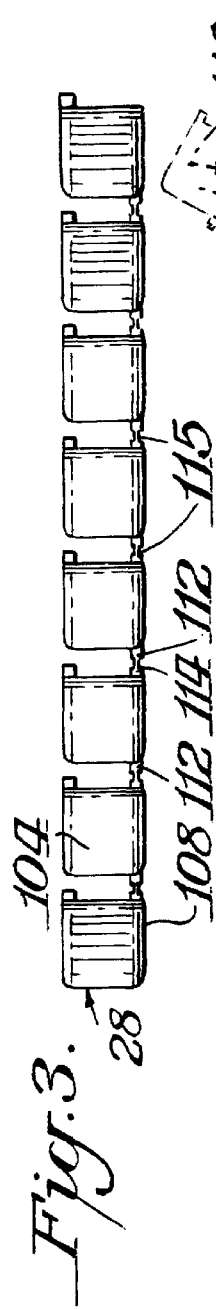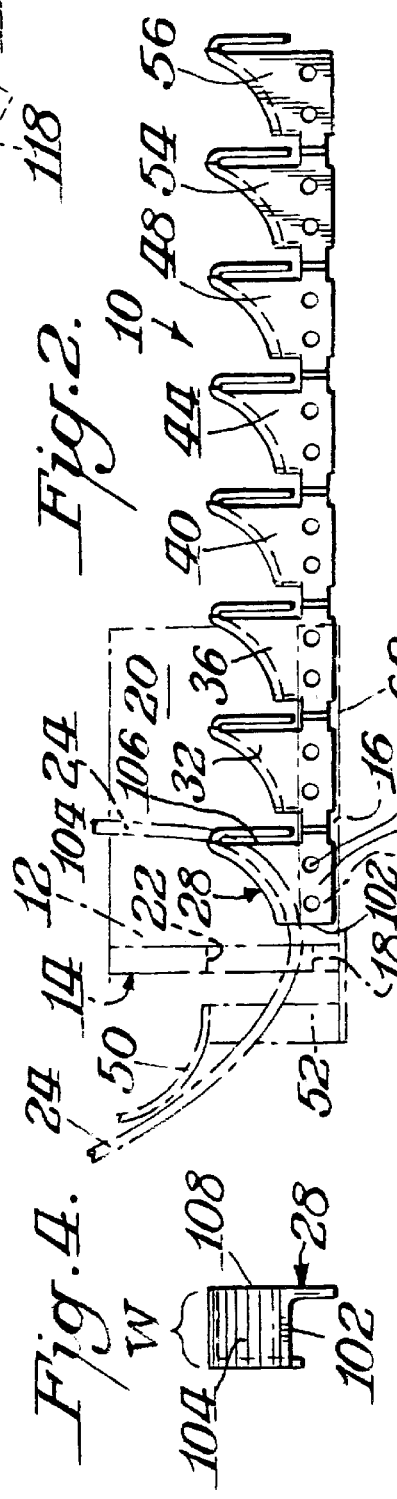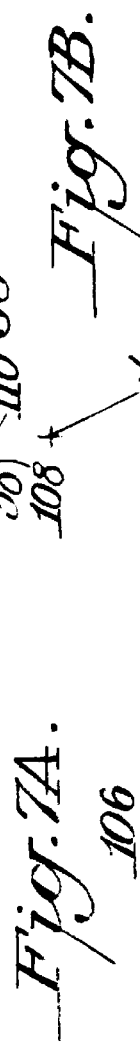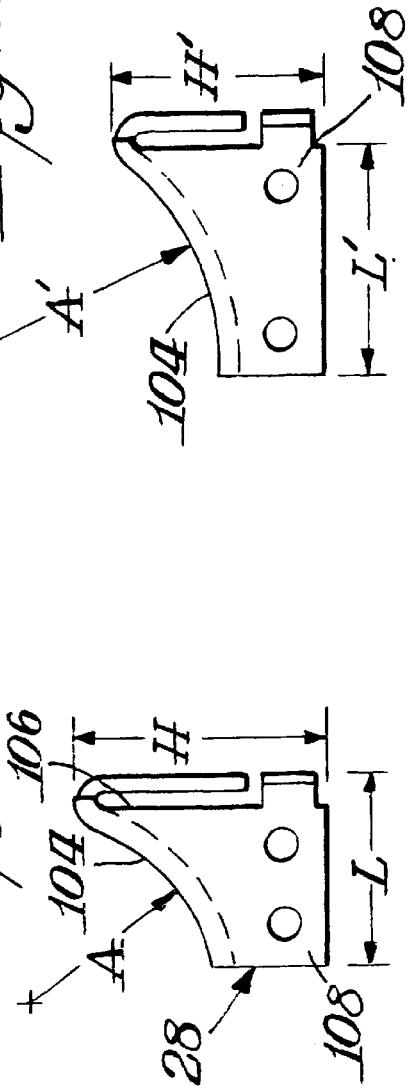

FIBER OPTIC CABLE MANAGEMENT SYSTEM

The present application corresponds to and claims priority of U.S. Provisional Patent Application Serial No. 60/197,192, filed on Apr. 17, 2000.

BACKGROUND OF THE INVENTION

A. Field of the Invention

The present invention relates generally to the communications field, and, more particularly to a fiber optic cable management system.

B. Description of the Related Art

Presently, it is a problem in the field of communication cable installation to ensure the precise placement of the communication cable without the possibility of damage to the communication cable by the provision of tight bends, or inappropriate use of fasteners, or inadequate support to the communication cable. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installer of communication cable is thus faced with the problem of routing the communication cable over surfaces, which typically include sharp bends, without over bending the communication cable, yet also securing the communication cable to these surfaces in a manner to ensure protection from damage.

This problem is further heightened when fiber optic cables are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which to fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fibers contained in the cable, and the shorter the life span of the cable.

Furthermore, the recent increase in bandwidth requirements for telecommunications systems has resulted in more densely packed equipment and fiber optic cables than prior systems. Many carriers or other consumers of optical communications equipment have a very limited floor space in which to place new equipment and fiber optic cables. For example, some carriers may only have a single open bay (or shelf) in which to place new equipment and fiber optic cables. If the communications equipment can be more densely packed, then a greater amount of equipment and fiber optic cables may be placed within the available space.

Thus, it is even more necessary now to be able to bend fiber optic cables around corners and other obstacles in order to route the cables to and from equipment such as computers, connector panels, junction boxes, etc. In some conventional systems, standard plastic parts route the fiber optic cables. These plastic parts are often too large and generic to work in the new, denser systems. In other conventional systems, custom sheet metal parts route the fiber optic cables. Custom sheet metal is expensive and also cannot be used in the new, denser optical communications systems, since they can cause damage to the densely-packed fiber optic cables in such systems.

Thus, there is a need in the art to provide an inexpensive means for routing fiber optic cables in the new, denser optical communications systems that may be easily customized by an installer and prevent the fiber optic cables from being bent beyond their minimum bend radii.

SUMMARY OF THE INVENTION

The present invention solves the problems of the related art by providing a fiber optic cable management system that may be provided in a bay (or shelf) of an optical communications housing. The fiber optic cable management system includes at least one and preferably several interconnecting fiber optic cable guides. Each fiber optic cable guide includes a radius limiting portion that prevents fiber optic cables from being bent beyond their minimum bend radii. The radius of the radius limiting portion of each guide controls the spacing between a specific guide and its adjacent, interconnecting fiber optic cable guides. The width and height of each fiber optic cable guide may be varied depending upon the optical communications system into which the fiber optic cable management system of the present invention is utilized. The interconnecting fiber optic cable guides may be easily disconnected from each other to allow the fiber optic cable guides to be used in different quantities. This allows an installer to customize the fiber optic cable management system to match the optical communications equipment.

In accordance with the purpose of the invention, as embodied and broadly described herein, the invention comprises a fiber optic cable management system, including: a plurality of interconnecting fiber optic cable guides, each fiber optic cable guide having: a radius limiting portion having a radius of curvature that guides fiber optic cables from a first direction to a second direction, and prevents the fiber optic cables from being bent beyond their minimum bend radii, a side portion connected to the radius limiting portion, and a leg portion connected to and extending away from the radius limiting portion, wherein the side and leg portions retain the fiber optic cables within each of said plurality of fiber optic cable guides.

Further in accordance with the purpose of the invention, as embodied and broadly described herein, the invention comprises a fiber optic cable guide for use in a fiber optic cable management system having a plurality of interconnecting fiber optic cable guides, the fiber optic cable guide including: a radius limiting portion having a radius of curvature that guides fiber optic cables from a first direction to a second direction, and prevents the fiber optic cables from being bent beyond their minimum bend radii; a side portion connected to the radius limiting portion; and a leg portion connected to and extending away from the radius limiting portion, wherein the side and leg portions retain the fiber optic cables within the fiber optic cable guide.

Still further in accordance with the purpose of the invention, as embodied and broadly described herein, the invention comprises a cable management system, including: a plurality of interconnecting cable guides, each cable guide having: a radius limiting portion having a radius of curvature that guides cables from a first direction to a second direction, and prevents the cables from being bent beyond their minimum bend radii, a side portion connected to the radius limiting portion, and a leg portion connected to and extending away from the radius limiting portion, wherein the side and leg portions retain the cables within each of the plurality of cable guides.

Still even further in accordance with the purpose of the invention, as embodied and broadly described herein, the invention comprises s cable guide for use in a cable management system having a plurality of interconnecting cable guides, the cable guide including: a radius limiting portion having a radius of curvature that guides cables from a first direction to a second direction, and prevents the cables from being bent beyond their minimum bend radii; a side portion connected to the radius limiting portion; and a leg portion connected to and extending away from the radius limiting portion, wherein the side and leg portions retain the cables within the cable guide.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a partial perspective view showing a fiber optic cable management system with fiber optic cables being provided therein from an optical communications cabinet, and in accordance with an embodiment of the present invention;

FIG. 2 is a front view of the fiber optic cable management system shown in FIG. 1;

FIG. 3 is a top plan view of the fiber optic cable management system shown in FIG. 1, with one fiber optic cable guide shown broken away in phantom outline;

FIG. 4 is a left side elevational view of the fiber optic cable management system shown in FIG. 1;

FIG. 5 is a perspective view of the fiber optic cable management system shown in FIG. 1, taken from the front side thereof;

FIG. 6 is a perspective view of the fiber optic cable management system shown in FIG. 1, taken from the rear side thereof; and FIGS. 7A and 7B are side views of two portions the fiber optic cable management system of the present invention, showing how the minimum bend radius of the portion may be varied.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Referring now specifically to the drawings, a fiber optic cable management system according to the present invention is illustrated in FIG. 1 and shown generally as reference numeral 100. The system 100 has particular application in the telecommunications industry for managing the connection, storage, and distribution of fiber optic cables. FIG. 1 shows fiber optic management system 100 as it is mounted in a bay (or shelf) 12 of an optical communications housing 14. Multiple housings 14 may be installed in an optical communications cabinet (not shown) with respective mounting brackets (not shown) used for mounting housings 14 to vertical support racks (not shown) of the optical communications cabinet. Only a single housing 14 is described below. Housing 14 is formed of identical top and bottom walls (a portion of the bottom wall is shown as reference numeral 16), and complimentary side walls (one side wall is shown as reference numeral 18) and a rear wall 20, wherein top wall, bottom wall 16, side walls, and rear wall 20 are integrally formed. A front door may be pivotally attached to one of the side walls so to enclose housing 14.

Side wall 18 has an opening 22 provided therein for receiving fiber optic cables 24 provided externally to housing 14, but internally to the optical communications cabinet. Fiber optic cables 24 are intertwined with fiber optic cable management system 100. Some cables 26 may be channeled by a first fiber optic cable guide 28 towards the top wall of housing 14 to optically communicate with other optical communications equipment, and some cables 30 may be provided trough first optic cable guide 28 and channeled by a second fiber optic cable guide 32 towards the top wall of housing 14. Other cables 34 may be provided trough first and second fiber optic cable guides 28, 32 and channeled by a third fiber optic cable guide 36 towards the top wall of housing 14, while cables 38 may be provided through first, second, and third fiber optic cable guides 28, 32, 36 and channeled by a fourth fiber optic cable guide 40 towards the top wall of housing 14. This process may be continued for cables 42, 46 and fifth and sixth fiber optic cable guides 44, 48.

Although fiber optic cable management system 100 of FIG. 1 only shows six fiber optic cable guides 28, 32, 36, 40, 44, 48, system 100 may have an application-specific number fiber optic cable guides, ranging from one to as many that will fit within housing 14. Furthermore, although FIG. 1 shows only two fiber optic cables being channeled through each of the six fiber optic cable guides, more or less than two cables may be channeled through each fiber optic cable guide, depending upon the application for which fiber optic cable management system 100 is being utilized.

FIG. 2 is a front view of fiber optic cable management system 100 of the present invention, showing how a single cable 24 (only cable is shown for clarity purposes) may be guided by system 100. As shown in FIG. 2, a fiber optic cable 24 may be guided, via a curved guide 50 attached to a protective lead bracket 52 provided in the optical communications cabinet, through protective lead bracket 52, through opening 22 of side wall 18, to first fiber optic cable guide 28. Curved guide 50 prevents cable 24 from being bent beyond its minimum bend radii. Cable 24 may then be guided through a front portion 102 of guide 28, engage a radius limiting portion 104, and exit a rear portion 106 of guide 28.

As further shown in FIG. 2 and FIG. 5, fiber optic cable management system 100 includes several (eight is shown in FIG. 2) fiber optic cable guides 28, 32, 36, 40, 44, 48, 54, 56 interconnected to each other. Each fiber optic cable guide preferably is identical, but may have different sizes, depending upon the optical communications application. Since each guide is preferably identical, reference will be made only to fiber optic cable guide 28, but applies equally to guides 32, 36, 40, 44, 48, 54, 56. Guide 28 further includes a side portion 108 integrally connected with radius limiting portion 104 and having at least one opening 110 provided therein, although a plurality of openings 110 may be provided. Opening 110 enables a conventional connecting means 58, such as a rivet, screw, bolt, etc., to be inserted therethrough for connecting fiber optic cable management system 100 to a channel 60 provided on bottom portion 16 of housing 14.

Another thing to note from FIGS. 2 and 5 is that they show eight interconnected fiber optic cable guides, whereas FIG. 1 showed six interconnected guides. The number of fiber optic cable guides may vary from one to as many that will fit within housing 14, depending upon the optical communications application. FIG. 3 shows how the number of interconnected fiber optic cable guide may be varied. As shown, side portion 108 of each fiber optic cable guide may include a front extension 112 and a rear extension 114 that interconnect a specific guide with neighboring guides, wherein front extension 112 of one guide interconnects with a rear extension 114 of an adjacent guide. Front and rear extensions 112, 114 of each guide include a tapered portion 115 that enables an installer to easily remove a fiber optic cable guide. As shown in phantom in FIG. 3, an installer need only pivot a guide in the direction of arrow 116, and an unnecessary guide 118 may be removed from fiber optic cable management system 100. Thus, system 100 may be provided as a continuous chain of interconnected fiber optic cable guides, and at any length desired. The installer need only count the desired amount fiber optic cable guides needed in a particular application, and break the continuous chain of guides at the correct tapered portion of extensions 112, 114.

FIGS. 4 and 5 best show the integral connection between side portion 108 and radius limiting portion 104 of each fiber optic cable guide. As further shown in FIG. 4, the connection between side portion 108 and radius limiting portion 104 forms an L-shaped front portion 102 for each guide. Fiber optic cable(s) enter to the left of side portion 108 and under radius limiting portion 104 of a fiber optic cable guide and either pass through the guide to the L-shaped front portion 102 of the next guide or engage the bottom surface of radius limiting portion 104 and are guided towards the top wall of housing 14.

FIG. 6 shows further features of fiber optic cable management system 100 of the present invention. FIG. 6 is a perspective view of fiber optic cable management system 100, taken from the rear side thereof. As shown from this Fig., each fiber optic cable guide includes a leg portion 120 integrally connected to and extending downward from radius limiting portion 104. When fiber optic cable(s) enter through front portion 102 of a fiber optic cable guide, engage the bottom surface of radius limiting portion 104, and are guided towards the top wall of housing 14, such fiber optic cables are retained within system 100 between leg portion 120 and side portion 108 of the guide. Thus, fiber optic cables being guided toward the top wall of housing 14 are not able to shift away from fiber optic management system 100, ensuring the cables are not damaged.

The radius limiting portion 104 of each fiber optic cable guide prevents fiber optic cables from being bent beyond their minimum bend radii. This prevents the glass fibers used in fiber optic cables from being damaged, ensuring the signal transmission quality and integrity of the cables. The fiber optic cable management system 100 also contains no sharp edges, which further prevents fiber optic cables from being damaged.

As best shown in FIGS. 7A and 7B, the radius of radius limiting portion 104 of each fiber optic cable guide may vary depending upon the fiber optic cable being used with fiber optic cable management system 100 of the present invention. As shown in FIG. 7A, for example, radius limiting portion 104 may have a radius A which provides a steeply inclined radius limiting portion 104. In contrast, as shown in FIG. 7B, for example, radius limiting portion 104 may have a radius A' which is larger than radius A, and provides a less steeply inclined radius limiting portion 104. Radius limiting portion 104 guides a fiber optic cable(s) from a first direction to a second direction, which is distinct from the first direction. The first direction may be lie in the same plane as the second direction, be perpendicular to the second direction, or lie in between the prior two directions.

However, the minimum bend radius of the fiber optic cables being used dictates the radius of radius limiting portion 104 of each fiber optic cable guide. As discussed previously, the minimum bend radius of a fiber optic cable depends upon a variety of factors, including the signal handled by the fiber optic cable, the style of the fiber optic cable, and equipment to which to fiber optic cable is connected. Thus, radius limiting portion 104 of each fiber optic cable guide may have a variety of radii greater than or equal to the minimum bend radii of the fiber optic cables, depending upon the type of cables being utilized. Radius limiting portion 104 may, for example, have a radius (A or A') greater than or equal to 0.75 inches (for fiber optic cables having a minimum bend radius of 0.75 inches), or a radius (A or A') greater than or equal to 1.0 inches (for fiber optic cables having a minimum bend radius of 1.0 inches).

In turn, the radius of radius limiting portion 104 controls the spacing between the fiber optic cable guides, as well as the height of each guide. With reference to FIGS. 7A and 7B, if the smaller radius A is chosen, a length L of side wall 108 would be smaller than a length L' of a larger radius guide (e.g., radius A' shown in FIG. 7B), but a height H of side wall 108 would be taller than a height H' of the larger radius guide (e.g., radius A'). Thus, the spacing between guides having a radius A would be less than the spacing between guides having a radius A', and height H of guides having a radius A would be greater than height H' of guides having a radius A'. Furthermore, the width W of radius limiting portion 104 may vary, as shown in FIG. 4. As the width W of radius limiting portion 104 increases, so does the fiber optic cable holding capacity of the fiber optic cable guide. Obviously the width W of radius limiting portion 104 cannot exceed the dimensions of housing 14.

There are a variety of ways to manufacture fiber optic cable management system 100. System may be cast from a metal, but preferably is injection molded. If molding is selected, system 100 may be molded from a compliant, high-strength plastic, but may be molded out of a variety of materials meeting the rigorous Network Equipment Building System (NEBS) reliability and flammability ratings. NEBS was originally developed by Bell Telephone Laboratories in the 1970s and expanded by Bellcore. Long a requirement for equipment used in the Central Office in the North American Public Switched Network, the NEBS criteria have become a universal measure of network product excellence.

NEBS covers a large range of requirements including criteria for personnel safety, protection of property, and operational continuity. NEBS covers both physical requirements including: space planning, temperature, humidity, fire, earthquake, vibration, transportation, acoustical, air quality and illumination; and electrical criteria including: electrostatic discharge (ESD), electromagnetic interference (EMI), lightning and AC power fault, steady state power induction, corrosion, DC potential difference, electrical safety and bonding and grounding. The term "electrostatic discharge" or "ESD", as used herein, refers to the rapid, spontaneous transfer of electrostatic charge induced by a high electrostatic field. Usually the charge flows through a spark (static discharge) between two bodies at different electrostatic potentials as they approach one another.

Thus, fiber optic cable management system 100 may be made from a material that attenuates ESD, EMI, or other destructive energy. In this regard, system 100 may be made from a heavily nickel-doped plastic.

It will be apparent to those skilled in the art that various modifications and variations can be made in the fiber optic cable management system of the present invention and in construction of this system without departing from the scope or spirit of the invention. As an example, typically, fiber optic cable management system 100 of the present invention will include multiple, interconnected uniform fiber optic cable guides, wherein all of the guides have the same dimensions. However, system 100 could also include multiple, interconnected fiber optic cable guides, with each guide having different dimensions.

System 100 of the present invention is not limited to use with fiber optic cables, and may be used with any cable having a minimum bend radius, such as, for example, telephone cable having a plurality of copper conductors, coaxial cable, or the like. In such an application, fiber optic cables 24, 26, 30, 34, 38, 42, 46 shown in the drawings, would be replaced with any cable having a minimum bend radius, such as telephone cable having a plurality of copper conductors, coaxial cable, or the like. Other examples of the modifications and variations that may be made to fiber optic cable management system of the present invention were set forth previously.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cable management system, comprising:
   a plurality of interconnected cable guides, each cable guide having:
      a radius limiting portion having a radius of curvature that guides cables from a first direction to a second direction, and prevents the cables from being bent beyond their minimum bend radii, a side portion connected to the radius limiting portion, and
      a leg portion connected to and extending away from the radius limiting portion, wherein the side and leg portions retain the cables within each of said plurality of cable guides,
   wherein said radius limiting portion, said side portion and said leg portion of the plurality of interconnected cable guides form a cable guiding channel therebetween in the first direction and successive ones of said radius limiting portions are adapted to guide successive ones of the cables from the cable guiding channel to the second direction.

2. A cable management system as recited in claim 1, further comprising a curved guide that guides the cables into said plurality of interconnecting cable guides, and prevents the cables from being bent beyond their minimum bend radii.

3. A cable management system as recited in claim 1, wherein said plurality of interconnected cable guides may be disconnected from each other.

4. A cable management system as recited in claim 1, wherein the side portion of each of said plurality of interconnected cable guides has a tapered extension to permit disconnection of said cable guides from each other.

5. A cable management system as recited in claim 1, wherein the radius of curvature of the radius limiting portion is greater than or equal to the minimum bend radii of the cables.

6. A cable management system as recited in claim 1, wherein the first direction is substantially perpendicular to the second direction.

7. A cable management system as recited in claim 1, wherein said plurality of interconnected cable guides comprises a plastic material.

8. A cable guide as recited in claim 1, wherein the cable is a fiber optic cable and the cable guide is a fiber optic cable guide.

* * * * *